R. L. STRINGFELLOW.
ANIMAL TRAP.
APPLICATION FILED FEB. 17, 1915.
1,181,044.  Patented Apr. 25, 1916.
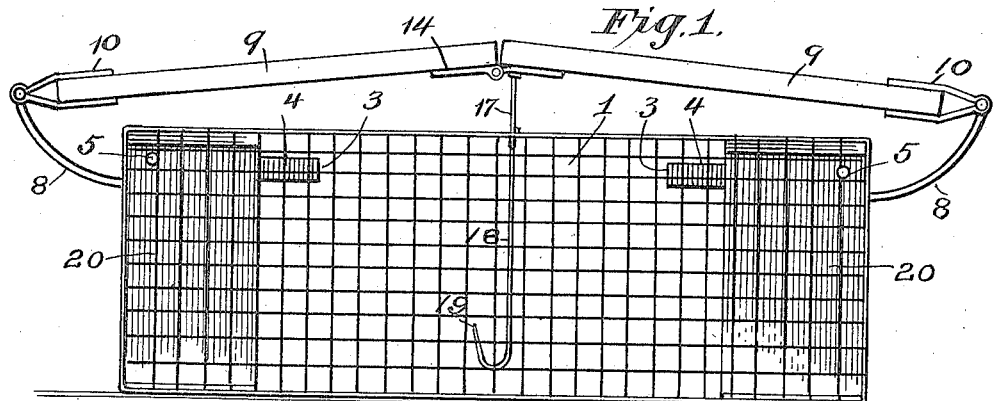
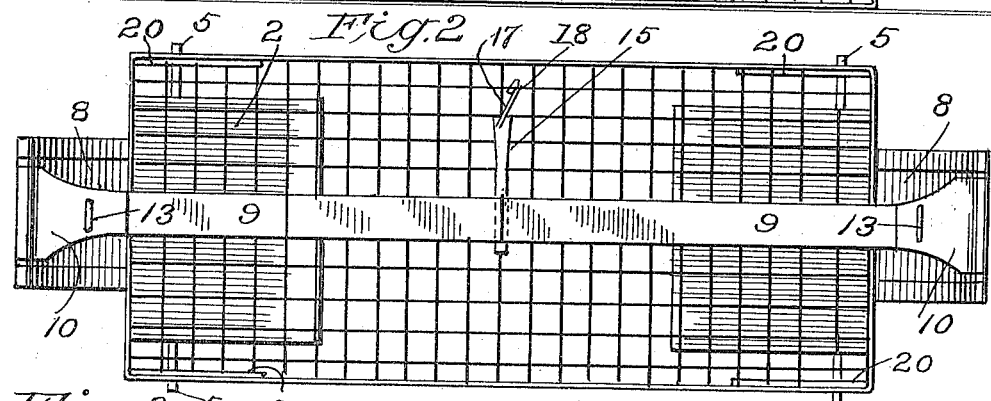
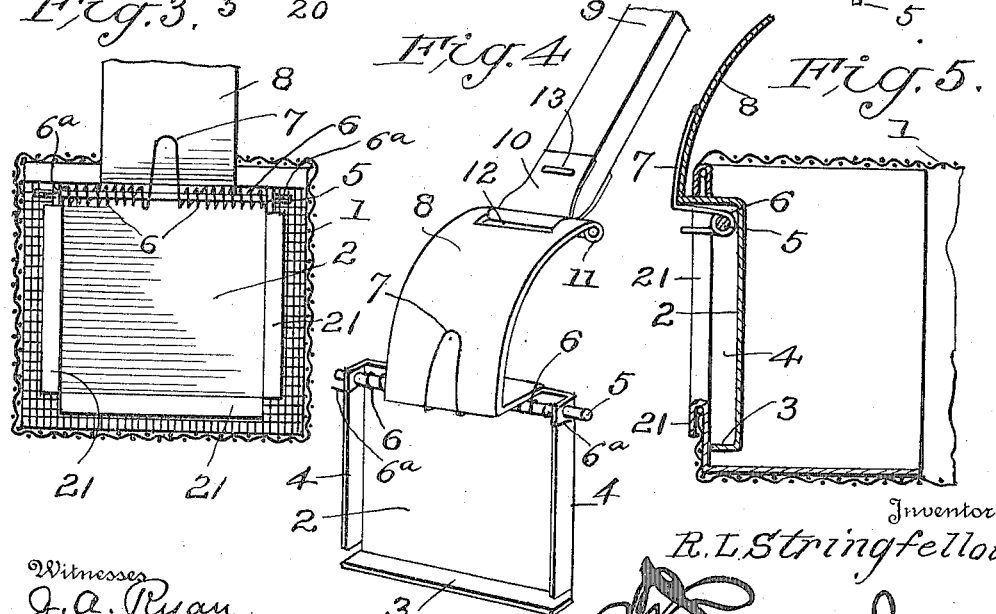
Witnesses
J. A. Ryan
Inventor
R. L. Stringfellow
By
Attorney

UNITED STATES PATENT OFFICE.

ROBERT L. STRINGFELLOW, OF WHITE BLUFFS, TENNESSEE.

ANIMAL-TRAP.

1,181,044.

Specification of Letters Patent.

Patented Apr. 25, 1916.

Application filed February 17, 1915. Serial No. 8,886.

*To all whom it may concern:*

Be it known that I, ROBERT L. STRING-FELLOW, a citizen of the United States, residing at White Bluffs, in the county of Dickson and State of Tennessee, have invented certain new and useful Improvements in Animal-Traps; and I do hereby declare the following to be a full, clear, and exact description of the invention, such as will enable others skilled in the art to which it appertains to make and use the same.

This invention relates to animal traps and one of the principal objects of the invention is to provide a trap which will be open at both ends and provided with spring doors which open inwardly and which will catch animals alive.

Another object of the invention is to provide a trap open at both ends and having spring actuated doors which open inwardly and upwardly and are provided with connected members hinged together in the center and held in horizontal position by a trigger and bait hook which if touched will spring the doors closed to catch the animal alive, said hinge members serving as a handle for the trap by which to carry the same.

The foregoing and other objects may be attained by means of the construction illustrated in the accompanying drawing, in which—

Figure 1 is a side elevation of the trap in set condition, Fig. 2 is a top plan view of the same, Fig. 3 is a detail end elevation of the trap with the door closed, Fig. 4 is a detail perspective view of one of the doors, and the connecting rod shown broken away, and Fig. 5 is a detail longitudinal sectional view of one end of the trap with the door closed.

Referring to the drawing, the numeral 1 designates the body of the trap which may be made of open wire mesh, or of other material and having both ends open. The doors 2 are each provided with a bottom flange 3 and side flanges 4 bent at right angles outward from the door 2, and a pintle 5 is journaled in the two side flanges at the top of the door and provided with a spring 6 wound about the pintle 5 and having a tongue 7 bearing against a curved portion 8 formed as a continuation of the upper portion of the door 2. The free ends 6ª of the spring bear against the flange 21 of the door frame, which will be more fully hereinafter described. The normal stress of the spring 6 is exerted to close the door.

Connected to the upper end of the curved portion 8 is a bar 9, said bar having a hinged member 10 connected thereto, and a pintle 11 connected to the curved portion 8 is extended through the hinged member 10. The curved portion 8 is cut away in the center as at 12 to admit the hinged portion 10 of the bar 9, said hinged member being connected to the bar by means of a staple 13. Each door is constructed and mounted in the same manner, and the bars 9 in the center of the trap are connected together at their ends by a hinge 14. The pintle of the hinge 14 is extended upon one side and flattened to form a trigger detent 15. A combined trigger and bait hook 16 is provided at its upper end with a trigger 17 which is bent around one of the wires of the top of the trap as shown at 18 to pivot the same, while at the lower end is a bait hook 19 disposed in the center of the trap and reaching near the bottom thereof.

The doors are pivoted in frames, which may be made of sheet metal and comprising inwardly extending portions 20 having outwardly extending flanges 21 connected to the body of the cage at each end. The pintles 5 extend through the metal frame members 20.

In setting the trap, the two members 9 are pressed down until the trigger 17 engages the flattened member 15 of the hinged pintle 14, thus swinging the doors inside of the trap in the position shown in Fig. 1 to give a clear opening through the trap intersected only by the trigger or bait hook. When the bait hook is touched both doors are thrown outward to close the openings at the ends of the trap and catching the animal alive.

From the foregoing it will be obvious that a trap made in accordance with this invention is simple in construction, inexpensive to manufacture, and is very efficient for its purpose, owing to the fact that both doors are opened and closed simultaneously to give the animal a clear view through the trap and thus induce him to enter.

Various changes may be made in the details of construction without departing from the spirit and scope of the invention as defined in the claims.

What is claimed is:—

1. A trap comprising a body portion open at opposite ends, spring actuated doors pivoted at each end and adapted to swing inwardly and upwardly within the trap, curved portions connected to each door, bars hingedly connected at one end to each curved portion, a hinge connecting the other ends of the bars, the pintle of the hinge being flattened to form a detent for the trigger, and a trigger pivoted to the trap and adapted to engage the flattened portion of the hinge, both doors being actuated simultaneously to open and close the same.

2. An animal trap open at opposite ends, spring actuated doors pivoted to the body portion and swung inwardly and upwardly within the body portion, said doors each having a curved portion, bars hinged at one end to each of said curved portions, a hinge connecting the other ends of the bars, a trigger for holding said bars down, and said bars serving as a handle when the trap is sprung.

In testimony whereof I affix my signature in presence of two witnesses.

ROBERT L. STRINGFELLOW.

Witnesses:
WILLIAM B. BAKER,
WILLIAM M. ADCOCK.